US007686324B2

(12) United States Patent
Nishi

(10) Patent No.: US 7,686,324 B2
(45) Date of Patent: Mar. 30, 2010

(54) SEAT FOLDING MECHANISM AND WHEEL CHAIR

(76) Inventor: Takao Nishi, 1-57, Nagamachi 3-chome, kanazawa-shi, Ishikawa-ken (JP)

( * ) Notice: Subject to any disclaimer, the term of this patent is extended or adjusted under 35 U.S.C. 154(b) by 586 days.

(21) Appl. No.: 10/581,536

(22) PCT Filed: Nov. 30, 2004

(86) PCT No.: PCT/JP2004/018277

§ 371 (c)(1),
(2), (4) Date: Apr. 10, 2007

(87) PCT Pub. No.: WO2005/053592

PCT Pub. Date: Jun. 16, 2005

(65) Prior Publication Data

US 2007/0273124 A1 Nov. 29, 2007

(30) Foreign Application Priority Data

Dec. 1, 2003 (JP) ............................ 2003-401911

(51) Int. Cl.
*B62B 3/02* (2006.01)

(52) U.S. Cl. ...................... 280/650; 280/647; 280/657; 297/315; 297/340

(58) Field of Classification Search ................. 280/642, 280/643, 647, 648, 650, 657, 47.38, 47.4, 280/47.41; 297/DIG. 4, 314, 315, 338, 340, 297/344.1

See application file for complete search history.

(56) References Cited

U.S. PATENT DOCUMENTS 4,754,987 A * 7/1988 Williams ................. 280/304.1
4,813,693 A * 3/1989 Lockard et al. ............... 280/42
6,595,586 B2 * 7/2003 Brightbill et al. ........... 297/312
7,003,820 B1 * 2/2006 Iura et al. ..................... 5/83.1

FOREIGN PATENT DOCUMENTS

JP 03-188853 8/1991

(Continued)

OTHER PUBLICATIONS

Abstract of Japanese Patent Publication No. 03-188853, Pub. Date: Aug. 16, 1991, Patent Abstracts of Japan.
Abstract of Japanese Patent Publication No. 05-253260, Pub. Date: Oct. 5, 1993, Patent Abstracts of Japan.

*Primary Examiner*—Glenn Dayoan
*Assistant Examiner*—John D Walters
(74) *Attorney, Agent, or Firm*—Martine Penilla & Gencarella, LLP

(57) ABSTRACT

A seat plate folding mechanism provided in a wheelchair or in a transfer device used to transfer of a person between a wheelchair and a bed etc. The mechanism enables easier transfer of a person with crippled limb between a wheelchair and bed, toilet seat, etc. The seat plates are folded, with the surfaces vertically set, to the sides of the occupant, to more rear-upward than an extended position. More particularly, the seat plate folding mechanism has stays whose base end sides are pivotally supported at side frames of a frame and has seat plates, one side of each of which is supported and connected at the head of a stay so as to be pivotable about a front-back shaft. The seat plates are folded by compound motion of swing of the stays and swing of the seat plates, the swing of the stay occurring at the section where the stay is pivotally supported at a side frame, the swing of a seat plate occurring at the section where the seat plate is supported and connected at the stay. The seat plates are folded to sides of the occupant, to more rear-upward than an extended position, with the surfaces vertically set. An L-shaped, reverse L-shaped, or lateral T-shaped stay is used as the stays, and the stays are supported at the side frames of the frame so as to be pivotable about vertical shafts.

8 Claims, 11 Drawing Sheets

FOREIGN PATENT DOCUMENTS

JP 05-253260 10/1993
JP 11239590 A * 9/1999
JP U3068034 2/2000
JP 2001286508 A * 10/2001

* cited by examiner

SEAT FOLDING MECHANISM AND WHEEL CHAIR

TECHNICAL FIELD

This invention relates to a folding mechanism of a seat plate set for a person to sit, particularly to a folding mechanism of a seat plate suitable for disposing in a wheelchair or a transfer device for a person with crippled lower limbs to transfer to a bed, and a wheelchair having such folding mechanism of a seat plate.

BACKGROUND ART

Japanese Patent Publication Nos. H5-253260 and H3-188853 (hereinafter referred to as D1 and D2, respectively) described below have proposed a wheelchair having a frame connecting left and right side frames in front of an occupant and transferring the occupant to a bed or like from the rear side by demounting the seat plate and backrest. In addition, Japanese Utility Model Registration No. 3068034 (hereinafter referred to as D3) described below has proposed a walking auxiliaries having foldable seat plates at the sides.

The wheelchair comprises a planar U-shaped or M-shaped frame connecting left and right frames 5 in front of the occupant's lower limbs with an occupant's backside including lower limbs opened; a seat supported on the frame; a space of a side frame opened at the rear so that the edge of the bed can be inserted from the rear to the underside of the seat.

Moreover, in the conventional wheelchair with a folding frame, two sides of the seat are pivotable around an axis running in the front and back directions and connected to side frames at both sides. For a wheelchair with a soft cloth seat, the seat is folded to a V-shape due to its dead weight when the frame is folded. In addition, a wheelchair with a rigid seat plate is folded to an inverted V shape. When the frame is folded, the seat remains attached to the side frame.

SUMMARY OF THE INVENTION

In a conventional wheelchair for an occupant to transfer from the front of the frame, the occupant, transferring between a bed and toilet seat, must change the direction of his/her body after standing up. Oppositely, for a wheelchair in which an occupant can be transferred from the rear of the frame by connecting the left and right side frames in the front of the occupant and making the rear of the frame opened, transfer between the wheelchair to a bed or toilet seat can be done without changing the direction of the body.

In order to accomplish the transfer, however, as described in D1 and D2, the backrest or seat plate must be demounted. The demounting of the backrest can be done by the occupant sitting on the seat plate. Moreover, the wheelchair can work as a chair if without a backrest, but it is almost impossible for an occupant with crippled lower limbs to remove the seat plate by oneself without a helper.

With regard to the structure described in D3, while transferring to a bed, the occupant must stand by oneself and move back and forth greatly, because the seat plate is folded downward on the sides, and the side frames supporting the seat plate also extend toward the rear of the occupant, thus causing a poor approach to the bed. Therefore, it is impossible for an occupant with crippled lower limbs to transfer without a helper.

Furthermore, the seat folding mechanism used for folding the frame cannot be used as a seat folding mechanism of a wheelchair for transfer from the rear of the frame, since the seat plate is connected to left and right side frames to disturb the backward movement of the occupant.

One object of the present invention is to provide a seat folding mechanism and a wheelchair having such folding seat plate, which can be used in a wheelchair for transfer from the rear of the frame, or in a transferring device in which transfer from the rear is performed in a conventional way, and which make it easier and more reasonable for an occupant with crippled lower limbs to transfer to a bed.

This invention achieves the above object by providing a folding mechanism and a wheelchair having such a seat folding mechanism, wherein the seat plate 11 is folded to the side of the occupant and toward the upper rear direction with the seat surface turned upright.

In one embodiment, the seat folding mechanism includes front and rear stays 2*a*, 2*b* of L-shape, inverted L-shape or transverse T-shape, which are supported on the side frames 5 rotatably around a longitudinal shaft 21. A seat plate 11 is supported by cross bars 22 of the front and rear stays, with the tip ends of the above cross bars being connected rotatably around the first axis 62 running in the front and rear directions and around the second axis 61, which is parallel to the above longitudinal shaft with the seat plate in positions close to the side edge 12, which is farther from the side frame 5.

According to the above mechanism, the seat plate 11 is folded toward the side of the occupant and toward an upper rear direction with the seat surface turned upright, by rotating the longitudinal shaft of the stays 2*a*, 2*b* toward the direction in which the cross bar 22 moves backward, or rotating the seat plate 11 toward the direction in which the side edge 14 near the side frame rises. Moreover, upon reverse actions, the folding seat plate 11 can be unfolded to form a seat surface.

The seat plate 11 can be constructed in any one of the following ways: the seat plate is split into left and right parts and folded in a state such that the left and right parts are attached to the side frames 5 located at respective sides, or the seat plate 11 is folded in a state such that the entire seat plate is supported by the stays 2*a*, 2*b* disposed at either side of the side frames 5, and is attached to one of the side frames.

In one embodiment, the seat folding mechanism includes side frames 5 located at left and right of the seat 1, and a seat plate 11 split into left and right parts. The left and right parts of the seat plate are mounted, with the above-described mechanism, respectively on the side frames 5 located at the left and right sides.

The structure that the seat plate 11 is split into left and right parts has the advantages of being compact in folding action and folding state, and being left and right symmetric for the frame structure. A significant advantage of the structure that seat plate 11 is split into left and right parts and the left and right parts are folded respectively toward the side frames 5 located at respective sides is that the upward displacement of the seat plate at the central portion of the seat when unfolding is very small, so that the occupant can fold and unfold the seat plate 11 by slightly raising his/her upper body.

In one embodiment, the, the longitudinal shaft/shafts 21 of the stays 2*a*, 2*b* is/are tilted forward and are rotatably supported on the side frames 5.

The position of seat plate 11 can be increased when folded, by tilting the longitudinal shaft 21 of the stays 2*a*, 2*b* forward. For instance, when the height of the bed to which one is being transferred is high, it is easy to avoid interference between the folded seat plate and the bed.

If the length of the cross bars 22 of the stays and the width of the folded seat plate 11 are made equal, when the rotating angle of the longitudinal shaft 21 and that of the seat plate 11 rotating around the axis 62 running in front and rear directions are equal, the side edge 14 of the seat plate 11 near the side frame 5 moves linearly toward the upper rear direction in a vertical plane. Thus, the folding and unfolding action of the seat plate 11 is made possible by providing a rotation-drive device for the longitudinal shaft 21 or a lift-drive device for the seat plate 11.

In one embodiment, the tip end of the cross bar 22 and the seat plate 11 are connected by a synchronous rotating mechanism 6, which connects the rotating angle around the axis 62 running in the front and rear directions and the rotating angle around the axis 61 parallel to the longitudinal shaft at a relationship of 1:1.

For instance, as shown in FIG. 6, the rotation angle of the stays 2*a*, 2*b* and that of the seat plate 11 can be synchronized at a relationship of 1:1 by mounting a miter gear (bevel gear with equal revolution ratio) on the connection portion 13 between the tip end of the cross bar 22 of the stay and the seat plate 11.

In one embodiment, the seat folding mechanism includes a backrest 3, and the backrest is mounted on the rear stay 2*b*.

In another embodiment, the seat folding mechanism includes a backrest 3, and the backrest 3 is mounted on either one of the left and right rear stays 2*b*.

The backrest 3 is mounted on the cross bar 22 of the rear stay 2*b* or the longitudinal shaft 21 via a bracket 31. If being mounted on the rear stay 2*b*, the backrest 3 rotates backward to retreat to the side, by the rotation of the rear stay 2*b* when the seat plate 11 is folded, thus a passage at the rear of the occupant is opened. When the seat plate 11 is unfolded, the backrest advances toward the place receiving the rear side of the occupant.

In one embodiment, the seat folding mechanism includes a footrest 4, which is supported for moving back and forth, and is connected to the front end of a joining bar 42, which extends beneath the seat from the lower end of the front stay 2*a*, via a link or a long hole 41 in the left and right directions.

In addition, in one embodiment, the footrest 4 includes a knee pushing plate 43 extending upward from its front edge portion.

The footrest 4 mounted in the above structure moves backward by means of the rotating action of the front stay 2*a* when the seat plate 11 is folded. Backward movement of the footrest 4 enables the soles of the occupant sitting thereon to move backward, thus minimizing the displacement of the barycenter of the occupant with respect to the soles when the occupant moves to a standing state from a sitting state. Moreover, the backward movement of the occupant becomes easier. If a knee pushing plate 43 is provided on the footrest 4, since the knees are enabled to move backward together with the soles, when the seat plate 11 is folded and the passage behind the occupant is open, the lower body of the occupant can be moved actively backward. Such a footrest 4 is very useful for a person with badly-crippled lower limbs and in a physically weak state.

In one embodiment, a wheelchair includes a planar U-shaped or M-shaped frame 50, which connects the left and right side frames 5 in the front of the occupant's lower limbs, with an occupant's backside including lower limbs open. A seat 1 is supported on the frame. A space 55 of the side frame with the rear side open is provided to allow the edge of a bed to be inserted from backside to the underneath of the seat. The wheelchair further includes a seat plate 11 that is split from the center into left and right parts, with stays 2*a*, 2*b* supporting the left and right seat plates with respective side frames 5. The above left and right parts of the seat plate are folded toward the side of the occupant and toward the upper rear direction with the surface turned upright, by means of their rotations around support shafts 21 of the stays.

In one embodiment, the wheelchair includes a front wheel 81 of large diameter, having a hand rim and supported pivotably on the side frames 5, and a rear wheel 82 of small diameter, swinging around a vertical support shaft to change direction.

So that an occupant can make the wheelchair move by oneself, the wheel of large diameter with a hand rim is necessary. As the wheel with a hand rim conventionally used as a rear wheel is now used as a front wheel, the interference between the edge of the bed inserted into the space 55 where the bed or toilet seat can be inserted and the wheel of large diameter can be avoided, and it becomes possible that the bed can be inserted beneath the seat 1 more deeply.

In one embodiment, the wheelchair includes a support table 32 supporting the upper body of the occupant, an ascend drive or ascend exerting device 71 for the support table, linkage mechanisms 24, 79 having an engaging-disengaging means 75 for folding the seat plate 11 when ascending and unfolding the seat plate when descending, and a lock device 76 for maintaining the seat plate 11 in a folded state.

The wheelchair with this structure has an ascend exerting device or lift device 71 for holding the upper body of a physically weak occupant when transferring, and linking with the ascending and descending of the support table 32 so as to conduct folding and unfolding of the seat plate 11, and through detaching a linkage of the ascending and descending of the support table from the folding of the seat plate, thus allowing the support table 32 to ascend and descend so as to support upward or descend the upper body of the occupant while the seat plate 11 remains folded. Consequently, when a physically weak occupant transfers by oneself or is assisted by a helper, the burden for either the occupant or the helper will be reduced.

The folding mechanism according to this invention can reasonably fold the seat plate 11 toward the side and upper rear direction by using a simple mechanism. A significant advantage of the folding mechanism of this invention is that the front rim of the seat plate 11 will not become an obstacle while the occupant stands up, because the seat plate 11 will be pulled backward when folded and the seat plate 11 will be advanced when unfolded. When the occupant stands up, his/her soles can be moved backward and the barycenter displacement can be reduced. When the occupant sits down, his/her feet can be guided forward by the front rim of the advancing seat plate 11.

Moreover, at the beginning of the folding action, great backward movement of the seat plate 11 is caused. Just before the occupant sits down, the seat plate 1 will be inserted from the rear below the upper body of the occupant, thus avoiding an interference between the seat plate 11 and the occupant when folded and unfolded, so that the occupant can stand up and sit down more smoothly.

According to the wheelchair of this invention, when the seat plate 11 and the backrest 3 are folded, the rear side of the occupant is open, thus, the occupant can transfer directly from the wheelchair backward to a bed or toilet seat, also resulting in an excellent approach of the occupant to a bed or toilet seat.

Furthermore, the folding or unfolding action of the seat plate 11 or the backrest 3 can also be performed by an exertion device or drive device using a gas spring or electrical motor. Thus, an occupant having a certain arm force can transfer between a wheelchair and a bed or a toilet seat or like without need of a helping hand. Moreover, if the occupant needs a helper during transferring, the labor of the helper can also be reduced.

DESCRIPTION OF EXEMPLARY EMBODIMENTS

Figure 1:
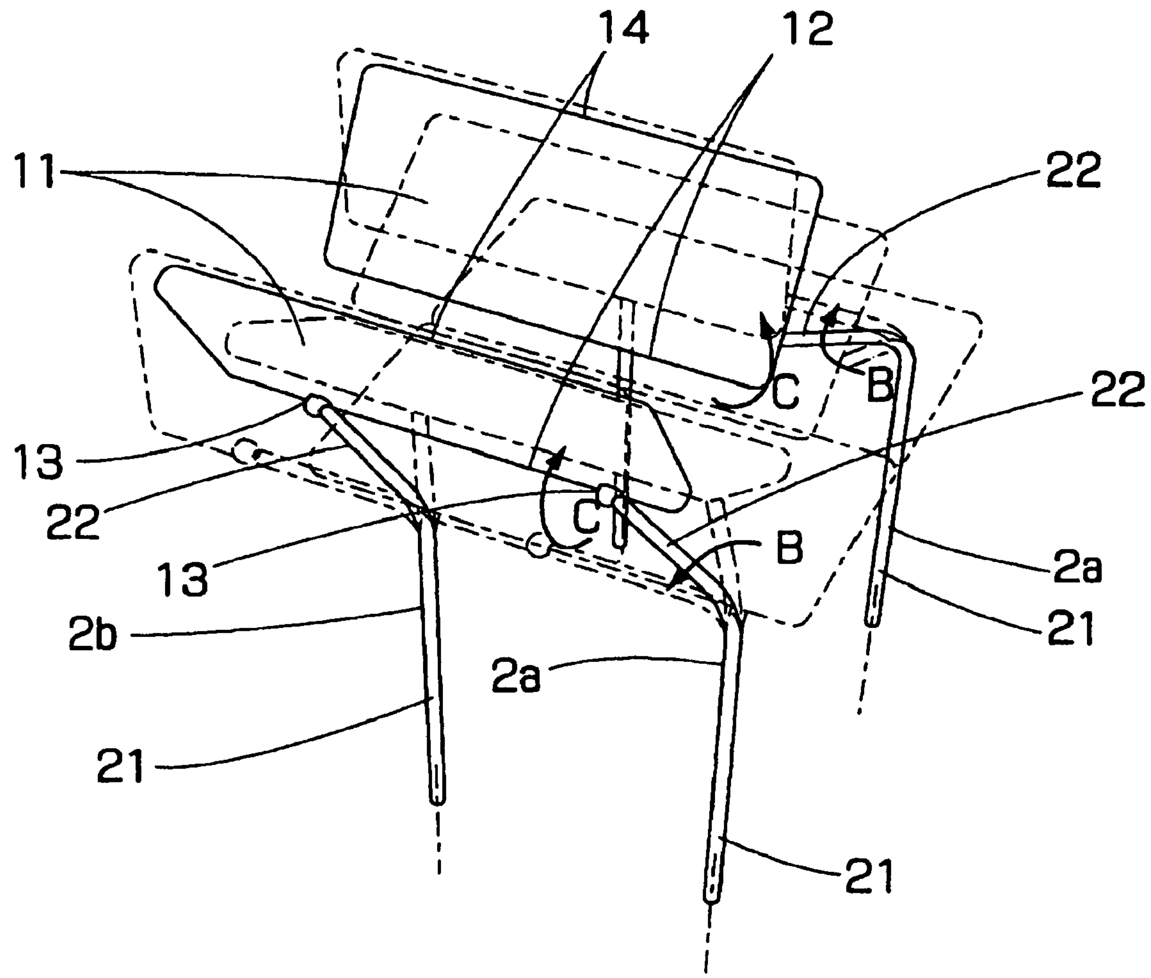
FIG. 1 is a view showing the working principle of a seat folding mechanism.

FIG. 1 is a view showing the working principle of a seat folding mechanism, and is an example having a seat plate 11 split into left and right parts. In the left and right side frames (not shown in the figure), two inverted L-shaped stays 2*a*, 2*b* separated in a predetermined interval are rotatably supported about the longitudinal shaft 21. The central edge 12 (an edge farther from the side frames) of the seat plate 11 split into left and right parts can be rotatably connected to the tip ends of the cross bars 22 of the stays 2*a*, 2*b* around the axis parallel to the longitudinal shaft 21 and around the axis parallel to the central edge 12 of the seat plate 11 which is extending in backward and forward directions. The interval between the front and rear joining portions 13 is equal to that between the stays 2*a*, 2*b* supported on the side frames.

In the structure shown in FIG. 1, if the outer side edge 14 of the seat plate 11 (an edge closer to the side frame) is pulled toward an inclined upper rear direction, stays 2*a*, 2*b* rotate around the longitudinal shaft 21 in the direction of arrow B, the seat plate 11 rotates around the central edge 12 in the direction of arrow C, and the seat plate 11, in a state that its backside faces toward the outer side, is folded toward an upper left direction of FIG. 1, with the surface of the seat turned upright along the side frame.

Figure 2:
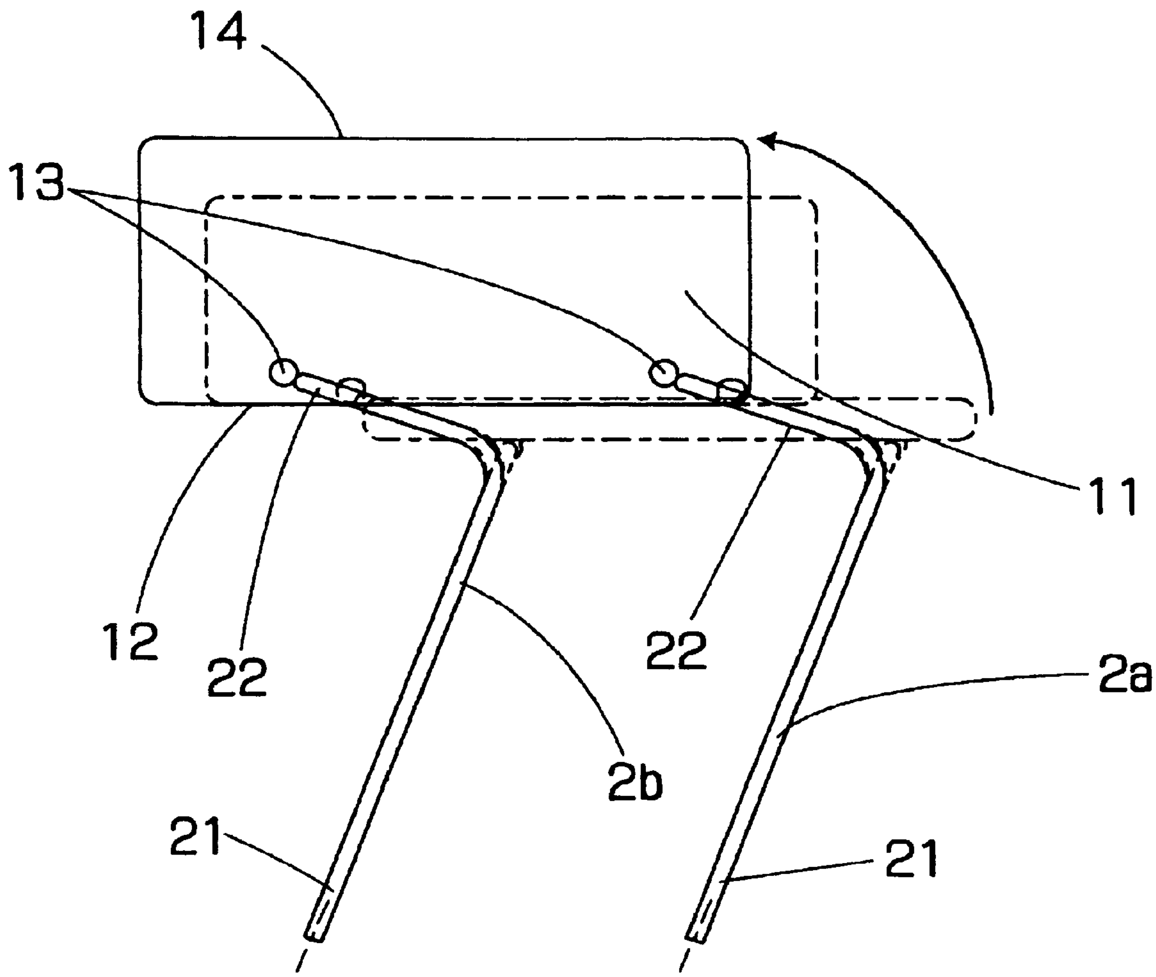
FIG. 2 is a side view of an example of the raising the folding position.

When one intends to increase the upper momentum of the folded seat plate 11, as shown in FIG. 2, just allow the longitudinal shaft 21 of stays 2*a*, 2*b* to be tilted in a direction where the upper end tilts forward, and to be supported pivotably on the side frames. In such case, the tip ends of cross bars 22 of stays 2*a*, 2*b* and the central edge 12 of the seat plate can be connected rotatably around the axis parallel to the tilted longitudinal shaft and around the axis extending in front and rear directions which is parallel to the central edge 12.

The stays 2*a*, 2*b* in FIGS. 1 and 2 are inverted L-shaped stays, but one or all of the stays can be formed into L-shaped stays. In addition, the stays can also be formed into a transverse T-shape of the cross bar 22 that extends from the middle of the longitudinal shaft 21. Even if the stays are used in a combination of L shape, inverted L shape, and transverse T shape, the cross bar 22 will surely extend at the same height along the bottom surface of the seat plate 11.

Figure 3:
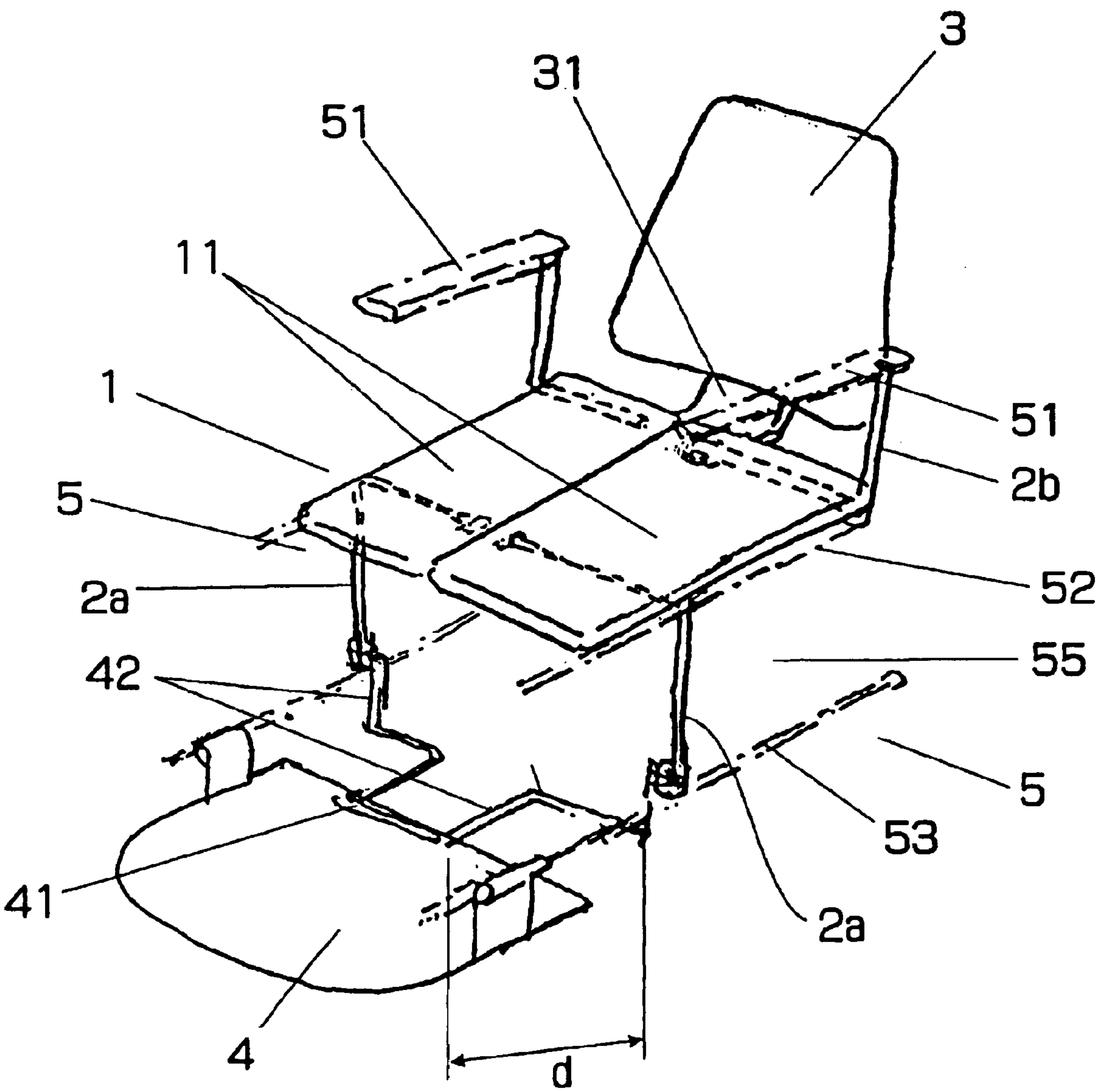
FIG. 3 is a perspective view of an unfolding state of a seat folding mechanism used in a wheelchair.
Figure 4:
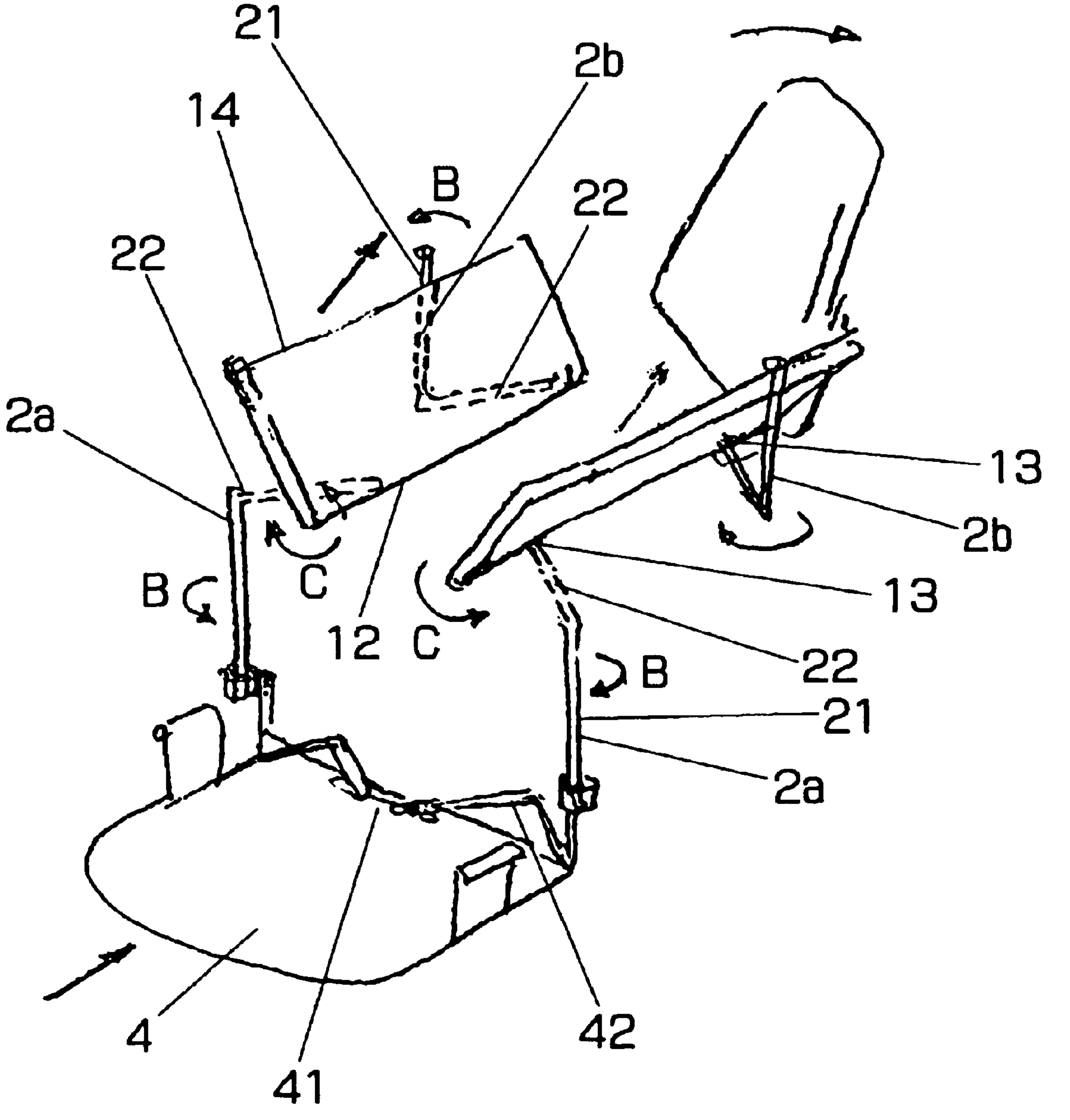
FIG. 4 is a perspective view of a seat folding mechanism of FIG. 3 during folding.
Figure 5:
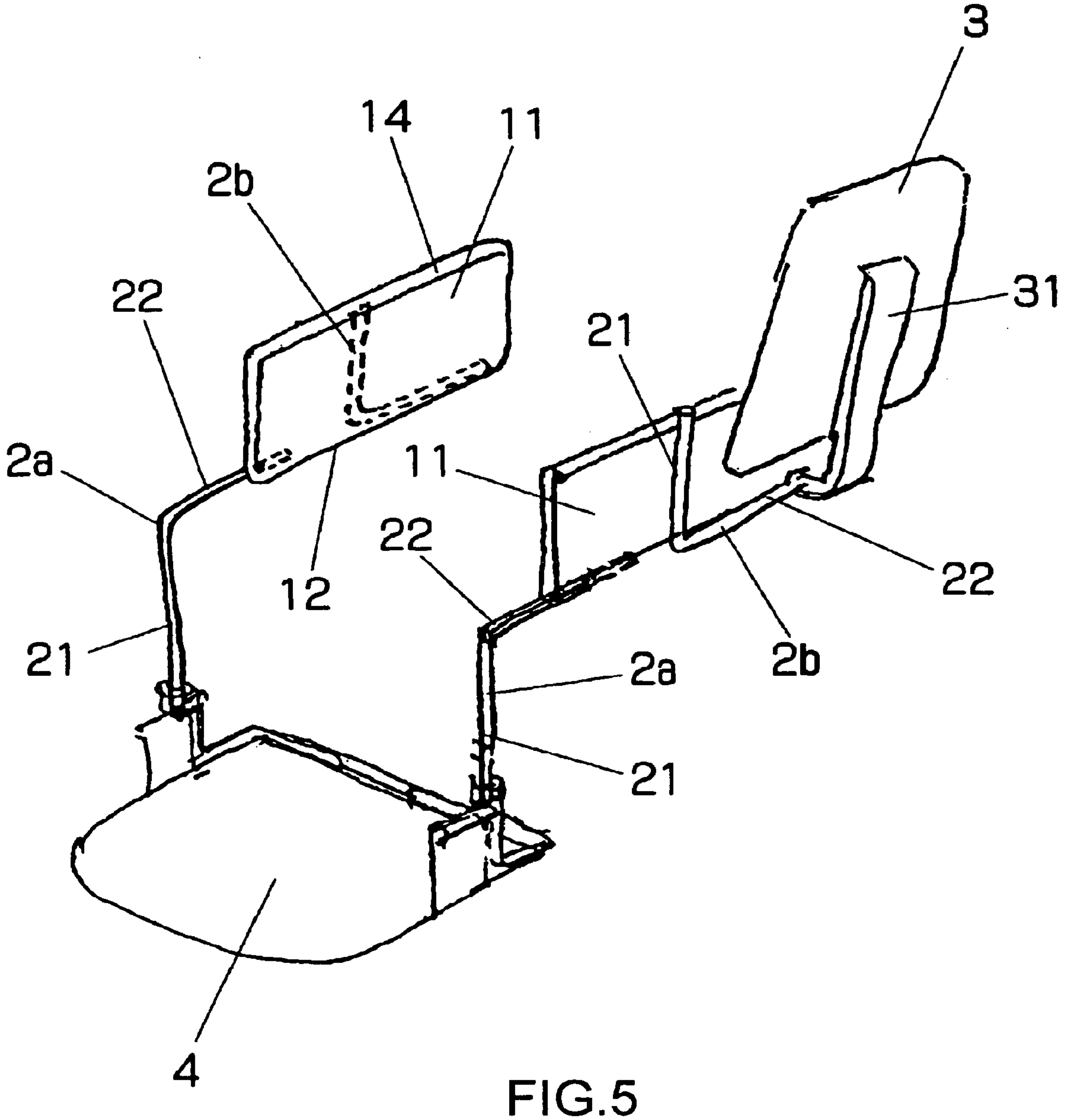
FIG. 5 is a perspective view of a seat folding mechanism of FIG. 3 in a folded state.

FIGS. 3 through 5 are views showing a more specific example of a seat folding mechanism having a backrest 3 and footrest 4, each of which are disposed on the wheelchair in this example. A part of the side frame 5 located at the left and right sides of the seat 1 and an armrest 51 located at the upper edge of the side frame are shown in FIG. 3 with imaginary lines. In this example, among the front and rear stays supporting the seat plate 11, the front stay 2*a* is of an inverted L shape, and the rear stay 2*b* is of L shape. The longitudinal shafts 21 of the front and rear stays are rotatably supported on the side frames 5. The longitudinal shaft of the front stay 2*a* is supported pivotably on the lower portion of the side frame 5, the longitudinal shaft of the rear stay 2*b* is pivotably supported on the upper portion of the side frame 5, and the cross bars 22 of the front and rear stays are at the same height.

Figure 6:
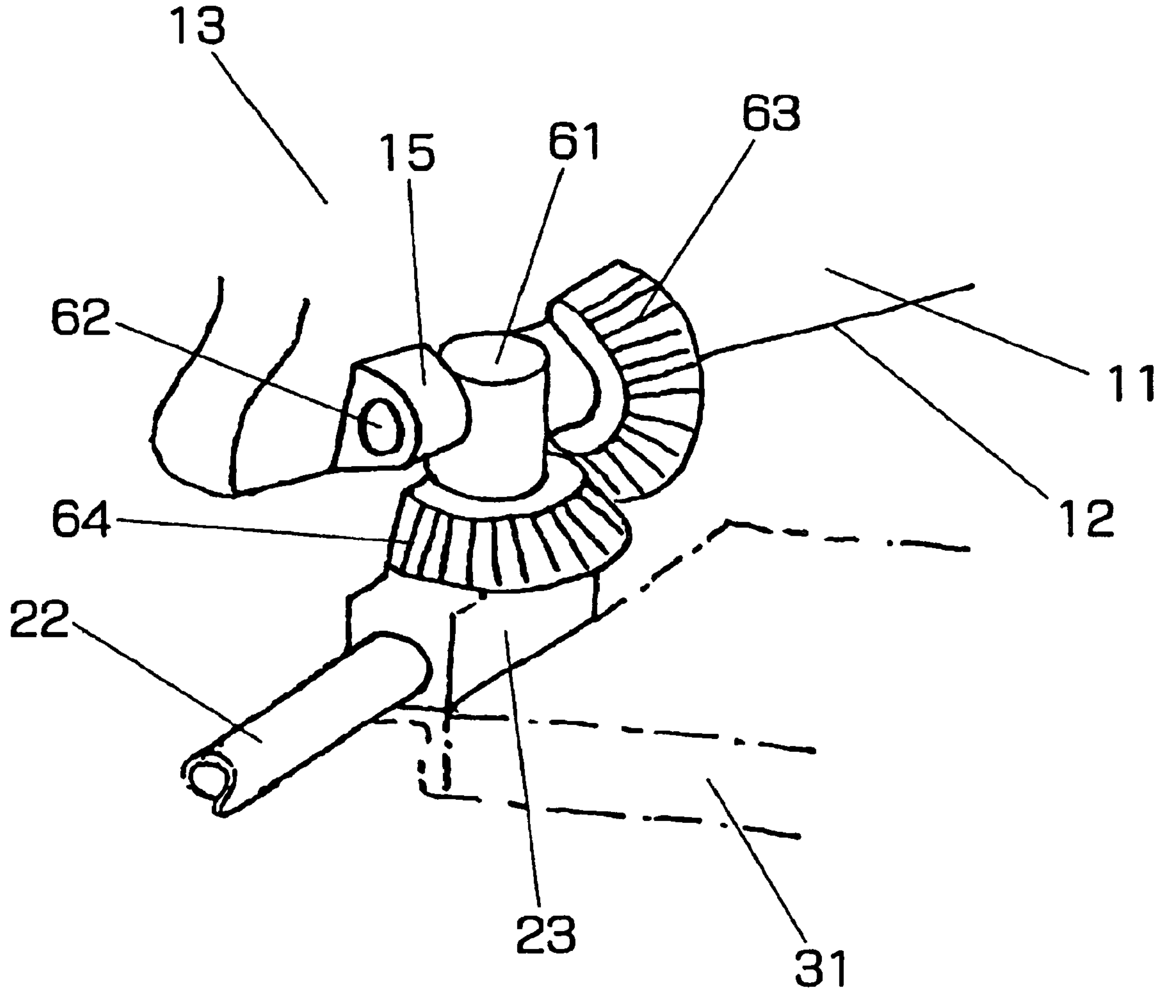
FIG. 6 is a perspective view of an example of a joining structure for the stays and the seat plate.

The connection between the cross bar 22 of the front and rear stays and the central edge of the seat plate 11 is shown in FIG. 1. An example of a specific configuration is shown in FIG. 6.

Figure 10:
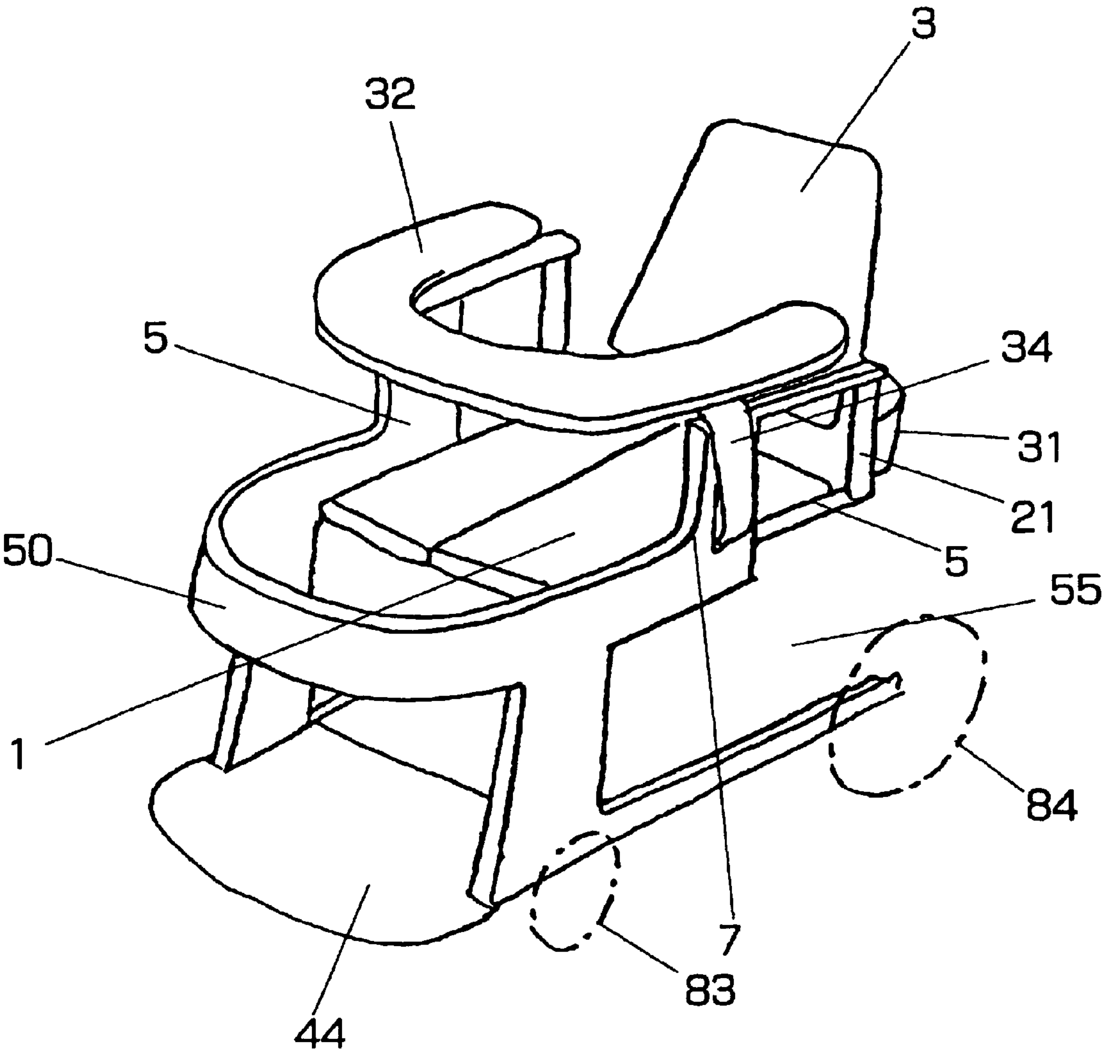
FIG. 10 is a perspective view of a third example of the wheelchair in accordance with yet another embodiment of this invention.

The backrest 3 in FIG. 3 is mounted on the cross bar 22 of the left rear stay 2*b* via a bracket 31. The bracket 31 supporting the backrest 3 can also be fixedly disposed on the longitudinal shaft 21 of the rear stay 2*b*, as shown in FIG. 10. When the backrest 3 is mounted on the left rear stay, it rotates and retreats toward the left rear direction during the folding of the seat plate 11. When mounted on the right rear stay, the backrest 3 retreats toward the right rear direction.

The backrest 3 may take such a configuration, wherein it can be longitudinally split into two parts at the center, with the split left part being mounted on the left rear stay, and the right part being mounted on the right rear stay. When the backrest 3 takes the configuration of being split into two parts, it has the advantage of reducing the protrusion amount of the seat plate 11 toward the rear of the backrest 3 when the seat plate is folded. On the other hand, for the structure in which the backrest 3 is supported by the rear stay of only one side, it has the following advantage, for example, while transferring to a bed, the occupant sitting at the end of the bed can easily lie down in the direction of having no backrest 3. Since an occupant usually transfers from a wheelchair to a bed through the side of a bed, it is reasonable to mount the backrest 3 such that the backrest 3 retreats toward the direction of the occupant's foot when he lies on a bed.

The footrest 4 is a flat plate, and is mounted movably back and forth on the lower edges of the side frames 5 located at both sides by using linear guides, the friction resistance of which can be reduced by means of balls. The rear edge of the footrest 4 is provided with a long hole 41 in the left and right directions. The front end of the joining bar 42 is inserted into the long hole 41, the joining bar 42 is bent forward 90 degrees after extending along the inner side from the lower end of the left and right front stays 2*a*. The front end of the joining bar 42 can move along the long hole 41. The joining bar 42 is formed into a bent bar such that interference between the footrest 4 and the joining bar 42 can be avoided and the moving stroke of the footrest 4 can be increased.

A synchronous rotation mechanism 6 shown in FIG. 6 can be disposed on the joining portion 13 of the tip end of the cross bar 22 of the front and rear stays and the central edge of the seat plate. The synchronous rotation mechanism 6 is one used to make the rotation angle of the stays 2*a*, 2*b* around the shaft 61, which is parallel to the longitudinal shaft 21 of the stay, be equal to the rotation angle of the seat plate 11 around the shaft 62 running in the front and rear directions.

In FIG. 6, the shaft 62 of the seat plate 11 is imbedded securely in a shaft hole of the bracket 15, and rotates integrally with the seat plate 11. The shaft 62 is fixed with a bevel gear 63 from which the part interfering with the seat plate 11 has been removed.

On the other hand, a block 23 is fixed at the tip end of the cross bar 22 of the stay, and the upper surface of the block is fixed with the bevel gear 64 from which the part interfering with the seat plate 11 when folded is removed. In the shaft center of the bevel gear 64, a joining shaft 61 parallel to the longitudinal shaft 21 of the stay stands vertically and rotatably around its shaft. The shaft 62 is penetrating rotatably into a through hole which is disposed in the radial direction of the joining shaft 61. The bevel gears 63 and 64 are engaged with each other, both having equal number of teeth, thus, the bevel gear 64, i.e., the rotation angle of the stays 2*a*, 2*b* are equal to the bevel gear 63, i.e., the rotation angle of the seat plate 11. The position where the rotation angle is 0 degrees is the position as shown in FIG. 3 with the seat plate 11 unfolded, which is at a direction where the cross bar 22 of the stay is perpendicular to the shaft 62.

By disposing the synchronous rotation mechanism 6 as shown in FIG. 6 at the joining portion 13 of the cross bar 22 of the front and rear stays and the seat plate 11, the rotation B of the stay and the rotation C of the seat plate 11 as shown in FIG. 4 can be linked on movement. Moreover, the rotations of the front and rear stays 2*a*, 2*b* can be synchronized, so that the folding and unfolding actions of the seat plate 11 will be smooth, and the guide mechanism guiding the side edge 14 of the side frame of the seat plate 11 becomes unnecessary.

When the front stay 2*a* or the rear stay 2*b* rotates from the unfolding state of the seat plate 11 as shown in FIG. 3 toward the direction B as shown in FIG. 4 where the cross bar 22 moves backward, and linked with this movement, the seat plate 11 rotates in the C direction where the side edge 14 of the seat plate 11 is enabled to move upward, and the seat plate 11 is folded toward the rear upper direction as shown in FIG. 1. In addition, together with the rotation of the rear stay 2*b*, the backrest 3 likewise rotates backward to retreat.

Furthermore, since the joining bar 42 swings backward along with the rotation of the front stay 2*a*, the footrest 4 moves backward through the swing. The distance between the bottom end of the joining bar 42 and the front end thereof is equal to the length of the cross bar 22. If the front end of the joining bar 42 as shown in FIG. 3 when the seat plate is unfolded is facing at a 45-degree angle forward, the footrest 4 moves backward only 1.4 times the retreating distance of the cross bar 22 of the stay. Therefore, the retreating distance of the folded seat plate 11 results in the folded state as shown in FIG. 5.

If the stays 2*a*, 2*b* rotate in the direction opposite to the direction B of FIG. 4 from the folded state of FIG. 5, the directions of all arrows in FIG. 4 will be reversed, and restored to the seat unfolded state of FIG. 3. If a hole is disposed under the seat plate 11 for clipping from above with the unfolded cross bar 22, the rotation of the cross bar 22 can be fixed by use of a slight descending action of the seat plate 11 when the occupant applies body weight to the seat plate 11 in the unfolded state.

Figure 7:
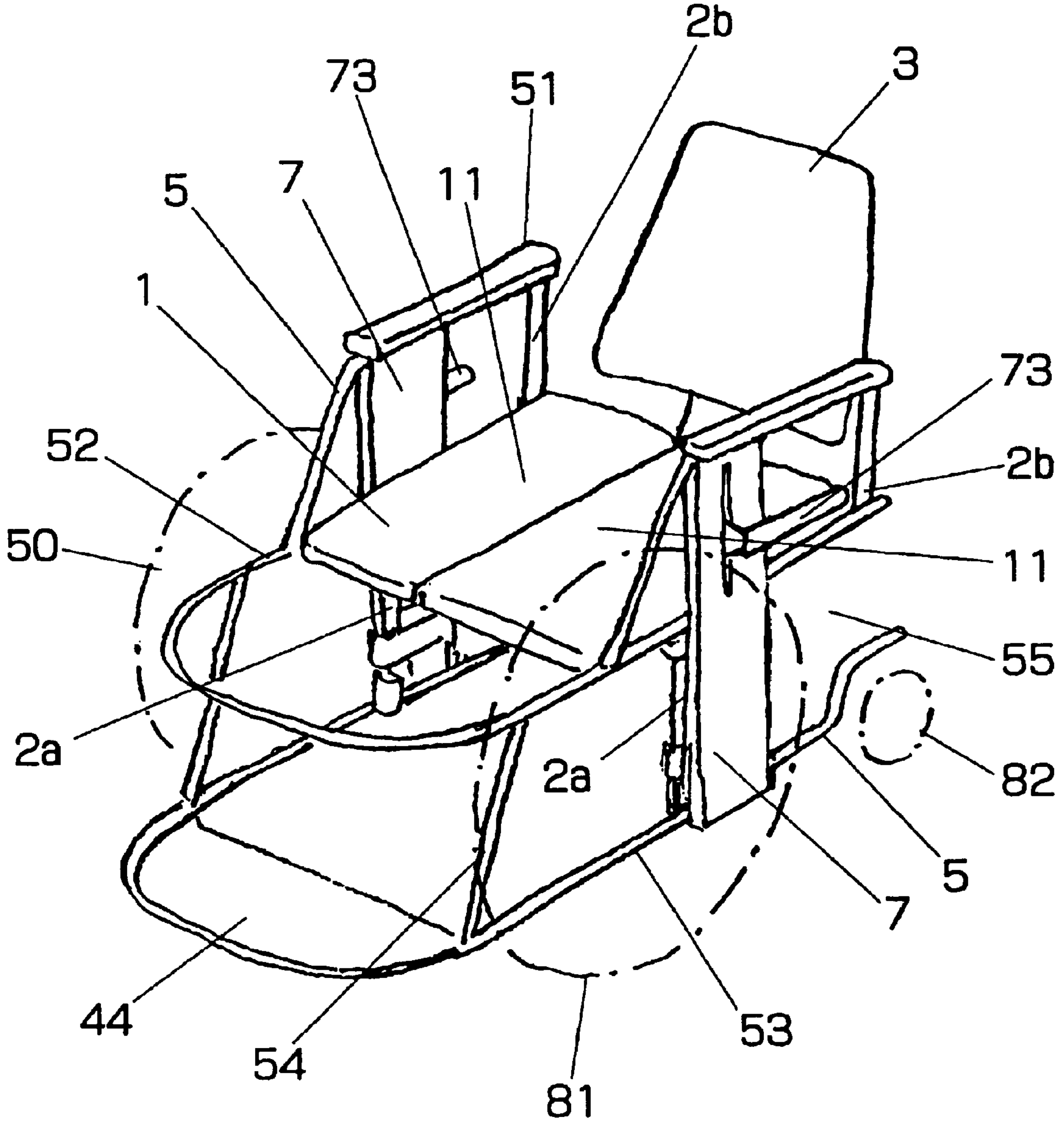
FIG. 7 is a perspective view of a first example of the wheelchair in accordance with an embodiment of this invention.

FIG. 7 shows the first example of the wheelchair with the present seat folding mechanism, which is used for those who have crippled lower limbs but with adequate arm force. The wheelchair has inverted L-shaped front stays 2*a*, L-shaped rear stays 2*b*, and a backrest 3, as shown in FIGS. 3 through 5, without a moving footrest 4 and joining bar 42, but with a fixed footrest 44 disposed on the frame 50 instead.

The frame 50 of the wheelchair shown in FIG. 7 is a structure connected by a longitudinal pipe 54 and a drive box 7, the longitudinal pipe 54 disposing the upper pipe 52 and lower pipe 53, which are bent to planar U-shape, in suitable locations. The drive box 7 is a box for accommodating the drive device for folding or unfolding the seat plate 11. The left and right frame portions including armrest 51 of the frame 50 and the drive box 7 constitute the side frames 5 located at respective left and right sides of the seat 1. At the rear of the foot of the occupant sitting at the seat 1, no member for connecting the left and right side frames 5 is provided. A space 55 opening backward is formed in between the upper pipe 52 and lower pipe 53 at the rear of the drive box 7. When transferring, the edge of the bed or the toilet seat is inserted in the space 55. A front wheel 81 mounted with a hand rim and a caster wheel 82 disposed at the rear are supported pivotably on the side frame 5, and are shown in the figure with imaginary lines.

Figure 9:
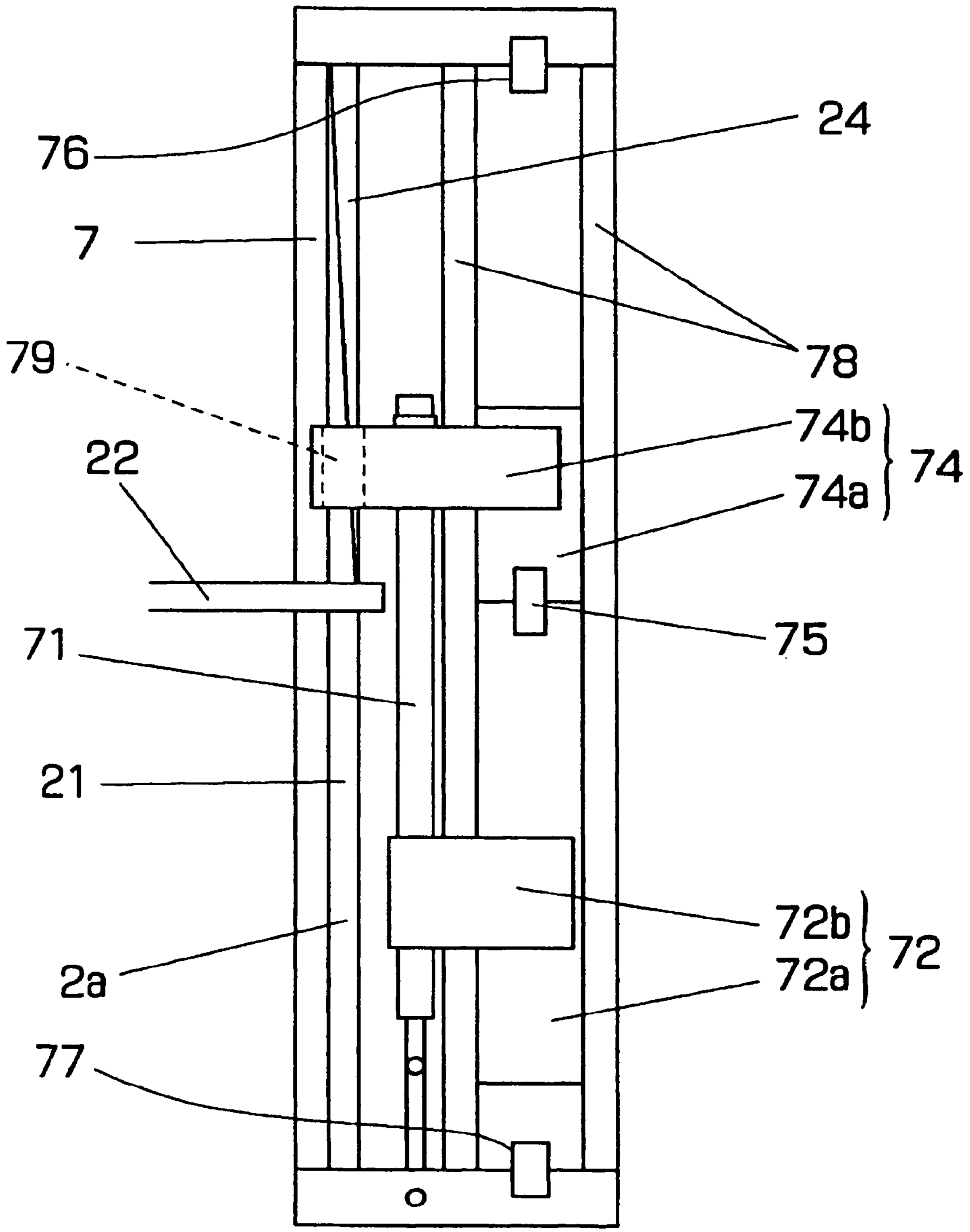
FIG. 9 is a side view showing an example of an exertion or drive device.

In the drive box 7 is provided therein a rotation drive device of the front stay 2*a* as shown in FIG. 9. The drive source is a gas spring 71, and a grip 73 fixed to a lift stage 72 is disposed at the outer side of the armrest 51. The lift stage 72 is connected to the gas spring for ascending and descending. Just over the lift stage 72, a lift bracket 74 is integrally connected by a joining member 75, and a spiral sleeve 79 provided at the front end of the lift bracket is imbedded in a spiral rod 24, which has the same central shaft integrally with the longitudinal shaft 21 of the stay 2*a*. The spiral rod 24 has a 90-degree helix, and while the lift stage 74 moves from the upper end to lower end, the spiral rod 24 is made to rotate 90 degrees, thus making the longitudinal shaft 21 of the stay 2*a* also rotate 90 degrees. The direction of spiral is a direction at which the stay 2*a* is enabled to rotate toward the folding direction of the seat plate 11 when the gas spring 71 elongates.

The grip 73 is connected to the lift stage 72, and the occupant presses it down by applying his/her body weight, thereby compressing the gas spring and unfolding the seat plate 11, and at the same time, the energy for subsequent folding is accumulated in the gas spring. At the armrest 51 is provided a lever for releasing the upper end lock 76, which clips the ascending position of the lift bracket 74, and at the grip 73 is provided a lever for releasing the lower end lock 77, which clips the descending position of the lift stage 72. All these levers are not shown in the drawings for ease of illustration, but are the same as levers 36, 37 as shown in FIG. 8.

The transfer between a wheelchair and a bed or a toilet seat is performed as follows. An occupant sitting on an unfolded seat plate 11 holds the armrest 51 and supports the body with arm force. Further, the occupant pulls the lever, which releases the lower end lock 77, and the lift bracket 74 is ascended to fold the seat plate 11 due to exertion force of the gas spring 71. In this state, the occupant can sit on the bed's end or toilet seat, which has been inserted from the rear into the space 55 under the seat plate 11.

During the transfer to the wheelchair from a bed or a toilet seat, the occupant holds the grip 73, supports the body with arm force and pulls the lever, which releases the upper end lock 76. The gas spring 71 is pressed down by means of the occupant's body weight applied on the grip 73 to unfold the seat plate 11, and the occupant can then sit on the seat plate 11.

Figure 8:
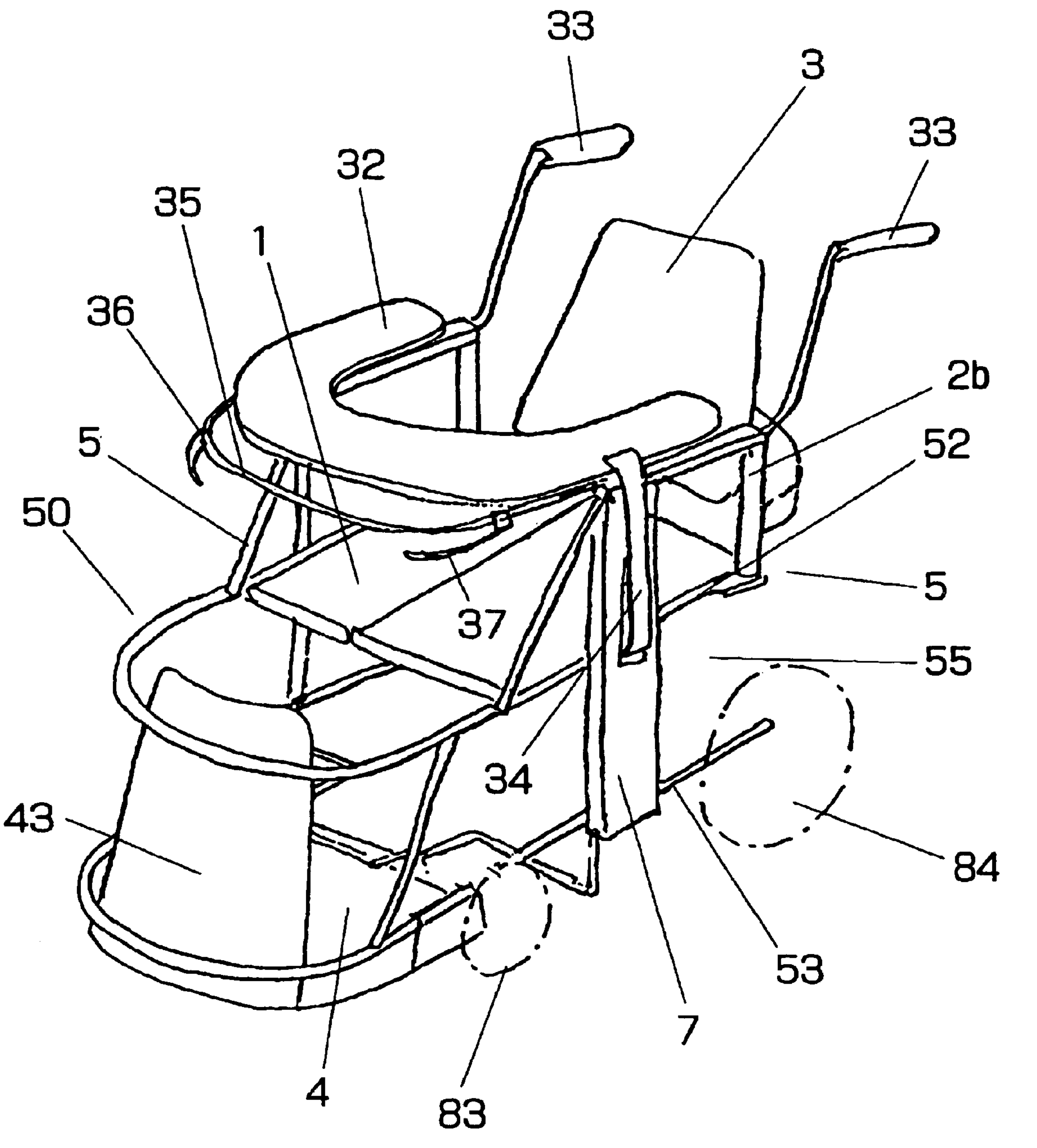
FIG. 8 is a perspective view of a second example of the wheelchair in accordance with another embodiment of this invention.

FIG. 8 is a view showing the second example of the wheelchair with the seat folding mechanism of the present invention for those sick or old persons who are physically weak. The wheelchair in FIG. 8 includes a horseshoe-shaped support table 32 against which the occupant leans his/her upper body while standing, a footrest 4 with a knee pushing plate 43 standing at the front portion thereof, and a handle 33 used by the helper to push the wheelchair. Both front and rear wheels 83, 84 are of small diameter, and the front wheel 83 is a caster wheel.

The gas spring 71 disposed in the drive box 7 has an exertion force only for supporting the upper body of the occupant. The support table 32 is connected to the lift stage 72 by a bracket 34. The support table 32 is fixed with a press-down bar 35, and on the press-down bar 35 are mounted two levers 36, 37 for releasing the upper end lock 76 and the lower end lock 77, respectively.

The transfer action with a wheelchair of the above structure is described as follows. The occupant leans his/her upper body against the support table 32, and the helper pulls the lever 37 for releasing the lower end lock 77. The support table 32 moves upward assisted by the exertion force of the gas spring 71 to support the upper body of the occupant, and at the same time, the seat plate 11 is folded. Meanwhile, the footrest 4 moves backward, and the knee pushing plate 43 pushes the occupant's knees to move the lower body of the occupant backward. If the lift bracket 74 reaches the ascending end and is clipped by the upper end lock 76, the joining member 75 connecting the lift bracket 74 and the lift stage 72 is dismounted, and the helper applies the body weight on the press-down rod 35 to compress the gas spring 71 so as to enable the support table 32 to descend. At this time, the lift bracket 74 is clipped by the upper end lock 76 and stays at the ascending end, thus the seat plate 11 remains in the folded state. Pushed by the knee pushing plate 43, the lower body of the occupant moves backward, and due to the descending of the support table 32, the occupant can sit on the bed's end or the toilet seat, which has been inserted into the space 55 under the seat plate 11.

During the transfer from a bed or a toilet seat to a wheelchair, the occupant leans his/her upper body against the support table 32, and the helper pulls the lever 37 for releasing the lower end lock 77. Consequently, the gas spring 71 ascends and the support table 32 moves upward, and contacts the lift bracket 74 waiting at the ascending position. Here, the joining member 75 is connected and the upper end lock 76 is released, and when the helper presses down the press-down bar 35, the lift bracket 74 attaching to the support table 32 and the lift stage 72 descends, the footrest 4 moves forward, and the seat plate 11 is unfolded, so that the occupant is sitting on the seat plate 11.

As a drive source, the gas spring 71 of FIG. 9 can be replaced by an electric reciprocal drive device or an electric motor using a speed reducing mechanism for rotating stays 2*a*, 2*b*. In this case, it is not necessary to install a battery in the wheelchair. Since the place where the transfer is performed is either bedside or toilet, if a magnet catch-type electric connection cord is provided at that place, the electric motor installed on the wheelchair can be driven by means of a commercial power supply.

Furthermore, in FIG. 9, the sign 78 is a lift guide, and the lift stage 72 and lift bracket 74 use the lift guide to guide the portions of the slider 72*a* and 74*a*. The arm 72*b* of the lift stage 72 is connected to the gas spring 71, and the arm 74*b* of the lift bracket 74 has a spiral sleeve 79 at its front end for making the spiral rod 24 rotate. The spiral rod 24 imbedded to the spiral sleeve 79 is disposed coaxially with the longitudinal shaft 21 of the stay and is integrated with the stay, and the front stay 2*a* can also be of a transverse T shape.

In addition, in the structure of FIG. 7, the lift stage 72 and lift bracket 74 should be connected fixedly. On the other hand, in the structure of FIG. 8, the lift stage 72 and the lift bracket 74 can be connected by a releasable joining member 75.

FIG. 10 is a view showing the example of a wheelchair with the front and rear stays shaped in an L shape. If both of the front and rear stays 2*a*, 2*b* are formed in an L shape, the space 55 under the seat plate 11 can be greatly expanded forward. If an electric motor or an air cylinder or like is used as a drive source for folding and unfolding of the seat, the height of the drive box 7 can be reduced. Moreover, as another structure, if the drive box 7 is disposed in front and from its upper portion the side frame is disposed in a cantilever shape, then even if a high drive box 7 is used, the drive box will not hinder the expansion of the space 55. If such a structure is used, since the bed side or a toilet seat can be inserted until it is directly below the front edge of the unfolded seat plate 11, even if no footrest moving backward is provided, the transfer can be performed only by descending to the original state the occupant supported by the support stage 32.

While commercializing the wheelchair described herein, the following items should be considered. A brake device should be disposed for preventing the wheelchair from an unintentional movement while folding the seat 1. As a brake device, it is preferable to use for example a brake device having a one-way clutch for preventing only the forward rotation of the wheel 81 or 84 or a band brake. By so doing, after the seat is folded, the wheelchair can move to the direction approaching the bed or the toilet seat at the rear of the frame.

Furthermore, for the wheelchair described herein, a table plate or a basket supported by the armrests 51 located at both sides can be disposed at the front of the occupant. A cover plate of the basket serves as a table, on which an electronic device or the like for an emergency call can be provided. In the structure of FIG. 7, if the grips 73 at both sides are disposed to support the table plate or the basket, the support device can be used for synchronizing the lifting of the grip located at both sides.

Figure 11:
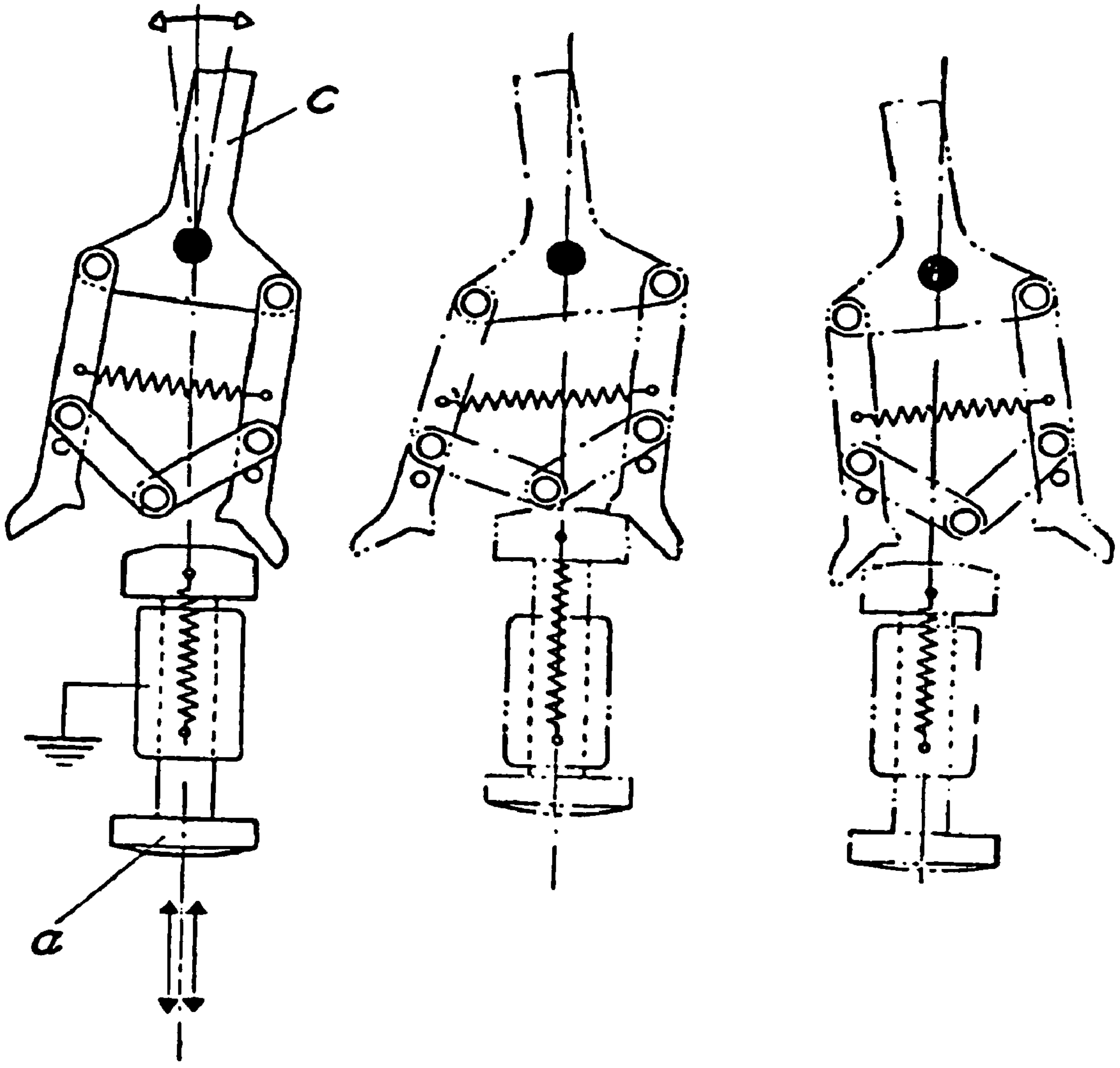
FIG. 11 is a view of "Button Mechanism" contained on page 1335 of the "Handbook of Mechanical Design" issued by Maruzen on Jun. 25, 1958.

In addition, the automation of the attachment and detachment of the upper end lock 76 and the joining member 75 of FIG. 9 can be realized by a toggle flip-flop action braking mechanism, while the support table 32 supporting the upper body of the occupant, and the like is provided when the seat is folded. For example, the lever C of the braking mechanism (as described above, the mechanism of FIG. 11 is a "press button mechanism" as shown on page 1335, "Handbook of Mechanical Design" issued by Maruzen on Jun. 25, 1958) as shown in FIG. 11 wherein the lever reciprocates once by use of twice lifting of the lift stage 72, which is mounted on the lift bracket 74, and a press button a for toggling the braking mechanism is disposed upward on the lift stage 72, at the upper end of the lever C is provided a hook clipped to the drive box 7, and at the lower end is provided a hook clipped to the lift stage 72. If the hooks are alternately clipped or released due to the swing of the lever C, the following action may be automated: the seat 1 is folded at the initial ascending of the lift stage 72, the hook is clipped or released at the ascending end, and at the subsequent descending and ascending time, the seat remains folded, and at the ascending end of second time, the clip or release of the hook is reversed, at the descending time of second time, the seat is unfolded.

The seat folding mechanism of this invention can be utilized as a mechanism of a wheelchair or a transferring means between a bed and a chair. By using the mechanism of this invention, an occupant can easily transfer between a wheelchair or a transfer device and other chair, bed, toilet seat, or like. Moreover, the structure of the mechanism is simple and it is also possible to be a structure where the seat plate is supported on one of the side frames. When a backrest is provided, the backrest may be linked in movement with the folding of the seat plate, and is folded toward the rear side direction. Thus, the folding mechanism can be used as a folding mechanism in a case where a foldable seat is disposed on the wall.

The invention claimed is:

1. A seat folding mechanism comprising:

front and rear stays that are L-shaped, inverted L-shaped or transverse T-shaped, rotatably supported on side frames around longitudinal shafts; and a seat plate supported by cross bars of the front and rear stays, with tip ends of said cross bars and the seat plate being connected rotatably freely around a first axis running in front and rear directions and around a second axis, which is parallel to one of said longitudinal shafts, in positions closer to one side edge of the seat plate, wherein the one side edge is farther from the side frame with respect to an other side of the seat plate.

2. A seat folding mechanism as claimed in claim 1, wherein the side frames are located at left and right sides of a seat, and the seat plate is split into left and right parts, wherein the left and right parts of the seat plate are mounted on respective sides of the side frames.

3. A seat folding mechanism as claimed in claim 1, wherein the longitudinal shaft of the stays is tilted forward and are rotatably supported on the side frames.

4. A seat folding mechanism as claimed in claim 1, wherein the tip ends of the cross bars and the seat plate are connected by a synchronous rotating mechanism which connects the rotating angle around the first axis running in the front and rear directions and the rotating angle around the second axis parallel to one of the longitudinal shafts at a relationship of 1:1.

5. A seat folding mechanism as claimed in claim 1, further comprising a backrest, wherein the backrest is mounted on the rear stays.

6. A seat folding mechanism as claimed in claim 2, further comprising a backrest, wherein the backrest is mounted on either one of the left and right rear stays.

7. A seat folding mechanism as claimed in claim 2, further comprising a footrest which is supported for moving back and forth, wherein the footrest is connected to a front end of a joining rod which extends beneath the seat from a lower end of the front stays via a link or a long hole extending in left and right directions.

8. A seat folding mechanism as claimed in claim 7, wherein the footrest comprises a knee pushing plate extending upward from a front edge portion of the footrest.

* * * * *